(12) United States Patent
Provost et al.

(10) Patent No.: US 8,590,402 B2
(45) Date of Patent: Nov. 26, 2013

(54) ASSEMBLY, INTERCALATED BETWEEN A TORQUE TOOL AND A FASTENING ELEMENT, FOR MEASURING TORQUES AND TIGHTENING ANGLES

(75) Inventors: Dan Provost, Abbotsford (CA); Drew Cheesman, Auckland (NZ); Shayne Harder, Abbotsford (CA); Aaron Johnson, Maple Ridge (CA)

(73) Assignee: Dan Provost, Abbotsford, BC (CA)

( * ) Notice: Subject to any disclaimer, the term of this patent is extended or adjusted under 35 U.S.C. 154(b) by 0 days.

(21) Appl. No.: 13/261,598

(22) PCT Filed: Sep. 2, 2011

(86) PCT No.: PCT/CA2011/001001
§ 371 (c)(1),
(2), (4) Date: Apr. 12, 2013

(87) PCT Pub. No.: WO2011/156918
PCT Pub. Date: Dec. 22, 2011

(65) Prior Publication Data
US 2013/0199307 A1    Aug. 8, 2013

(51) Int. Cl.
*G01L 5/24* (2006.01)
(52) U.S. Cl.
USPC .................................. 73/862.21; 73/862.23
(58) Field of Classification Search
USPC ........................................ 73/862.21–862.26
See application file for complete search history.

(56) References Cited

U.S. PATENT DOCUMENTS

| | | | |
|---|---|---|---|
| 3,753,625 A * | 8/1973 | Fabrizio et al. | 408/239 R |
| 3,889,490 A * | 6/1975 | Nadolny | 464/23 |
| 4,802,540 A * | 2/1989 | Grabovac et al. | 177/211 |
| 5,058,439 A * | 10/1991 | Carpenter | 73/862.21 |
| 5,898,598 A | 4/1999 | Szwast et al. | |
| 6,196,071 B1 | 3/2001 | Shomo | |
| 6,629,055 B2 | 9/2003 | Mc Gee et al. | |
| 7,082,865 B2 * | 8/2006 | Reynertson, Jr. | 81/479 |
| 8,083,596 B1 * | 12/2011 | Silver et al. | 464/31 |
| 8,215,187 B2 * | 7/2012 | Chen | 73/862.21 |
| 2006/0236827 A1 * | 10/2006 | Chiu et al. | 81/475 |
| 2010/0299084 A1 * | 11/2010 | Chen | 702/41 |
| 2011/0107882 A1 * | 5/2011 | Chen | 81/479 |
| 2012/0006161 A1 * | 1/2012 | Chen | 81/479 |
| 2012/0119919 A1 * | 5/2012 | Chen | 340/665 |

* cited by examiner

*Primary Examiner* — Lisa Caputo
*Assistant Examiner* — Jonathan Dunlap
(74) *Attorney, Agent, or Firm* — Frederick Kaufman Inc.

(57) ABSTRACT

The assembly comprises: 1) a socket subassembly having an unitary elongated body, including at one extremity a first engaging cavity, at an opposite extremity, a second engaging cavity: and incorporating an externally open, annular channel provided between the extremities of the socket subassembly: 2) a strain transducer subassembly, for measuring torsional strains on the socket subassembly, mounted in the externally open annular channel: 3) a circular cover attached to the socket subassembly for enclosing the externally open, annular channel: and 4) an electronic subassembly for converting the torsional strains on the socket subassembly to standard torque values and for determining tightening angular displacements by means of a sensor: the electronic subassembly being interconnected to the strain transducer subassembly and mounted on the circular cover to face the strain transducer subassembly.

1 Claim, 8 Drawing Sheets

ASSEMBLY, INTERCALATED BETWEEN A TORQUE TOOL AND A FASTENING ELEMENT, FOR MEASURING TORQUES AND TIGHTENING ANGLES

I. BACKGROUND OF THE INVENTION

1. Field of the Invention

The present invention relates in general to sockets for interconnecting torque tools and fastening elements and, more specifically, to an assembly intercalated between a torque tool and a fastening element, for measuring torques and tightening angles.

2. Description of the Prior Art

In fastening operations, it is often required to tighten a threaded fastener until it is adequately tensioned, thereby insuring that the latter securely holds the work piece. In order to install threaded fasteners, such as screws, bolts, nuts or the like, a tool is used to apply the required torque or tension. In critical applications, the installing tool apparatus does not have the means of measurement, is incapable of accurately measuring the require tension, or it is required that a secondary measurement device be used to verify that the required tension has been achieved.

There are several accepted methods for measuring the applied tension in threaded fasteners. In one method, the required tension is determined by applied torque, which is previously established by engineering calculus. According to this method, the torque, or torsional load is often measured using strain gauge(s). According to another method, the required tension is measured by an angular displacement of a fastener. Attempts have been made to develop an apparatus, using various ultrasonic techniques, for directly measuring fasteners tension. For example, U.S. Pat. No. 5,058,439 granted on Oct. 22, 1991 to Carpenter for a "UT Socket Assembly" discloses an ultrasonic transducer socket assembly, used with a torque tool, for simultaneously tightening a bolt and measuring bolt load. A pole adaptor rigidly attached to a driving socket for engaging and driving a bolt has a stationary cylinder mounted therein. A second cylinder, rotatable and slidably received in the stationary cylinder, has an ultrasonic transducer pivotally mounted at one end that contacts the bolt to be tightened, when the socket is engaged with the bolt. The rotating cylinder and transducer are rotated approximately 180 degrees during engagement of the socket and bolt to smear an even couplant layer between the bolt and transducer to assure consistent measurements of bolt load during tightening a socket assembly including a ultrasonic transducer capable of measuring the bolt tension.

Although directly measuring bolt tension is advantageous, the foregoing apparatus has several disadvantages. Among them, the fact that the apparatus incorporates complex mechanical features which can negatively affect the precision of the measurements, increases the manufacturing cost, reduces the reliability, and greatly increases the length and weight of the socket which in many applications is impractical.

II. SUMMARY OF THE INVENTION

Based on the state of the art, there is a need for an improved apparatus that reliably measures the torque directly applied to a threaded fastener.

Thus, it is an objective of the present invention to devise an apparatus therefore which is reliable, compact, and provides precise measurements of torsional strain and/or angular displacement.

It is another objective to provide the applied torque in Engineering Units (for example, lbs-ft, or NM) achieved by storing calibration values relating the torsional strain to torque.

It is yet another objective of the present invention to provide means to remotely monitor, and record the applied torque and/or angular displacement of a fastener.

It is yet another objective of the present invention to provide a means to signal to a tool apparatus to shut-off at a pre-established applied torque and/or angular displacement.

Broadly stating, the assembly, intercalated between a torque tool and a fastening element, for measuring torques and tightening angles comprises, in combination:

a socket subassembly having an unitary elongated body, including at one extremity a first engaging cavity, at an opposite extremity, a second engaging cavity; and incorporating an externally open, annular channel provided between the extremities of the socket subassembly;

a strain transducer subassembly, for measuring torsional strains on the socket subassembly, mounted in the externally open, annular channel;

a circular cover attached to the socket subassembly for enclosing the externally open, annular channel; and a electronics subassembly for converting the measured torsional strains on the socket subassembly to standard torque values and for measuring angular displacement of the fastener;

the electronic subassembly being interconnected to the strain transducer subassembly and mounted on the circular cover to face the strain transducer subassembly.

In one aspect, the assembly, intercalated between a torque tool and a fastening element, for measuring torques and tightening angles comprises, in combination:

a socket subassembly including a first engaging cavity, shaped to conform to and engage with the torque tool exit shaft, usually of square drive type; a second engaging cavity being shaped to conform to and engage with the fastening element, of a specific size; the externally open, annular channel being provided with a circular bottom surface for mounting a strain transducer subassembly;

the strain transducer subassembly comprising four strain gages, equally spaced from each other on the circular bottom surface, intended for measuring torsional strains; each of the four strain gages being of the 45 degree dual grid shear pattern and being made of constantan comprising a pair of parallel, juxtaposed strain elements, so arranged that a convergence line of the parallel, juxtaposed strain elements is parallel to the longitudinal axis of symmetry of the socket subassembly, for measuring torsional strains, only; the strain transducer subassembly being wired in a Wheatstone bridge to produce analog voltage signals, proportional to only torsional strains in the socket assembly, and therefor in the fastening element;

said circular cover subassembly comprising a first and second semicircular segments; the first semi-circular segment incorporating an axial and radial protrusion and diametrically opposed threaded openings; the second semi-circular segment incorporates a pair of fastening openings, corresponding to the diametrically opposed threaded openings; the diametrically opposed threaded openings and the pair of fastening openings being used for attachment of the first and second semi-circular segments by fasteners;

an electronic subassembly comprising a processing unit, a user interface unit and a power supply unit;

the processing unit including a microcontroller for digital and analog signal processing, mounted on the first semi-circular segment and connected to the strain transducer subassembly for converting the torsional strain into standard engineering units of torque, for measuring angular displacement by means of a sensor for providing date/time function to time stamp tightening cycles and measured parameters, and for parameter and configuration memory storage;

the user interface unit including a display, mounted on the first semi-circular segment and interconnected to the microcontroller, for showing the selected imposed parameters (applied torque and/or angular displacement), and for showing the running and final measured parameters (applied torque and/or angular displacement);

a connection port, mounted to the first semi-circular segment and interconnected to the processing unit for communication to an external device or for the purpose of controlling the torque tool shut-off at the imposed parameter (applied torque and/or angular displacement);

a keypad, interconnected to the processing unit for selecting the desired parameter for verification (applied torque and/or angular displacement), or for selecting the parameter (applied torque and/or angular displacement) at which to signal the torque tool's own controller to shut-off at the imposed parameter (applied torque and/or angular displacement);

a pass/fail indicator, interconnected to the processing unit, for showing if the measured parameter (applied torque and/or angular displacement), is within the pre-established upper parameter limit and lower parameter limit as defined by the user; and the power supply unit including a power source in the form of a battery and a battery charging and protection circuit.

II. BRIEF DESCRIPTION OF THE DRAWINGS

IV. DESCRIPTION OF THE PREFERRED EMBODIMENTS

Figure 1:
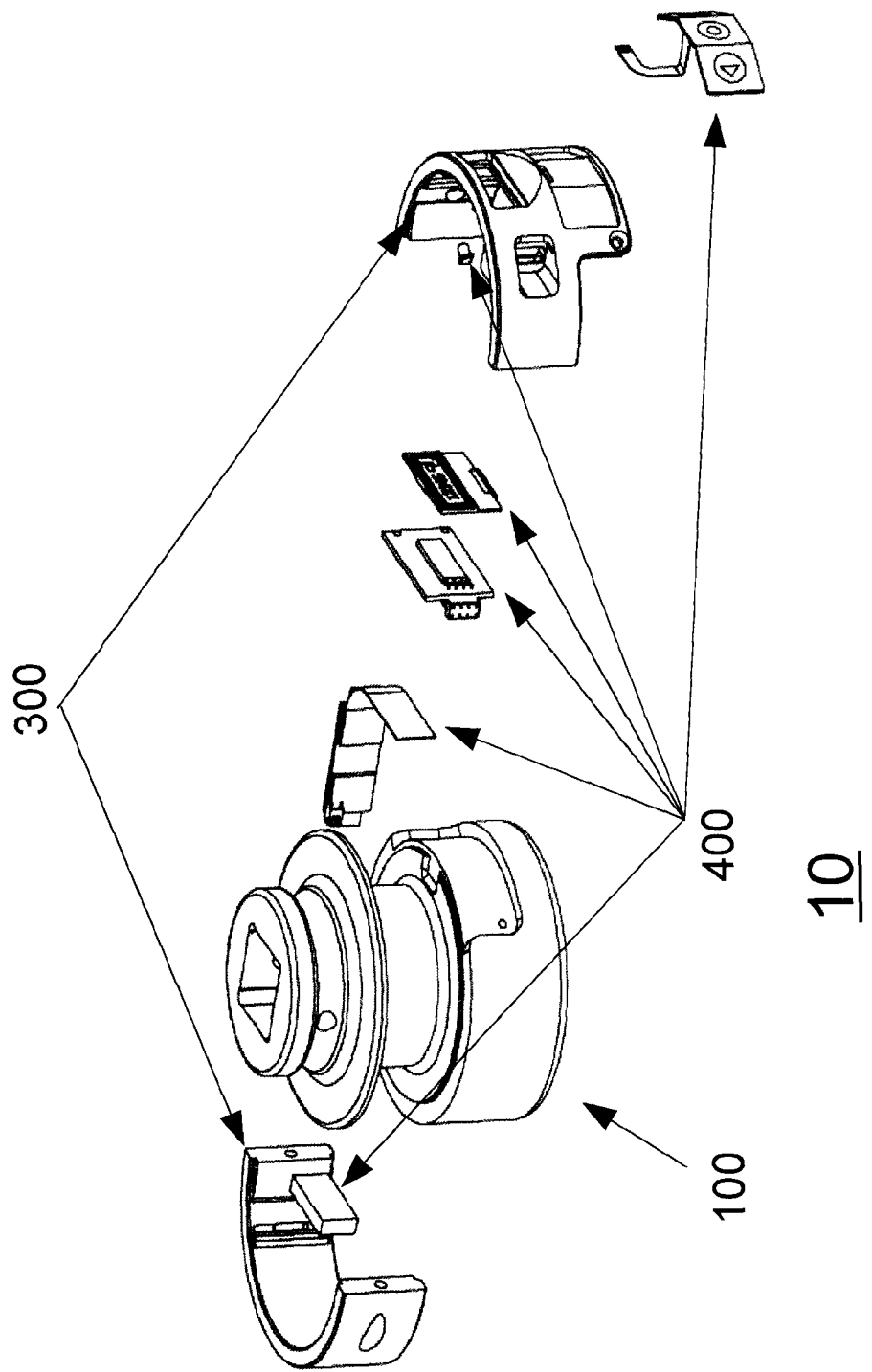
FIG. 1 is a prospective, exploded view of the assembly, intercalated between a torque tool and a fastening element, for measuring torques and tightening angles.
Figure 1B:
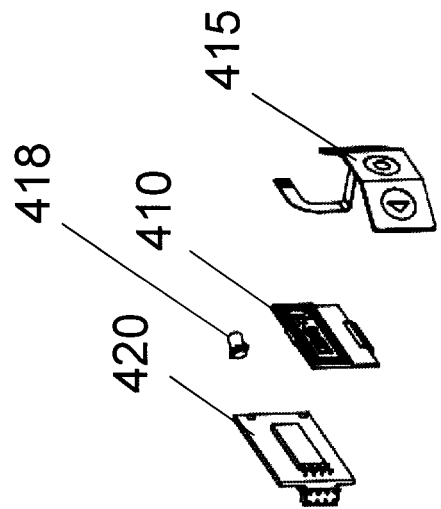
FIGS. 1A, 1B and 1C are prospective views of a processing unit A, a user interface unit B and a power supply unit C, which units compose an electronic subassembly of the assembly of FIG. 1.
Figure 1A:
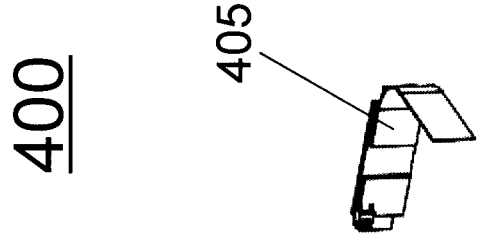
Figure 1C:
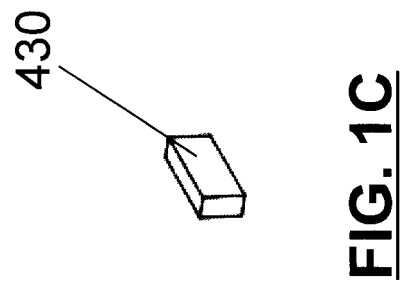
Figure 2:
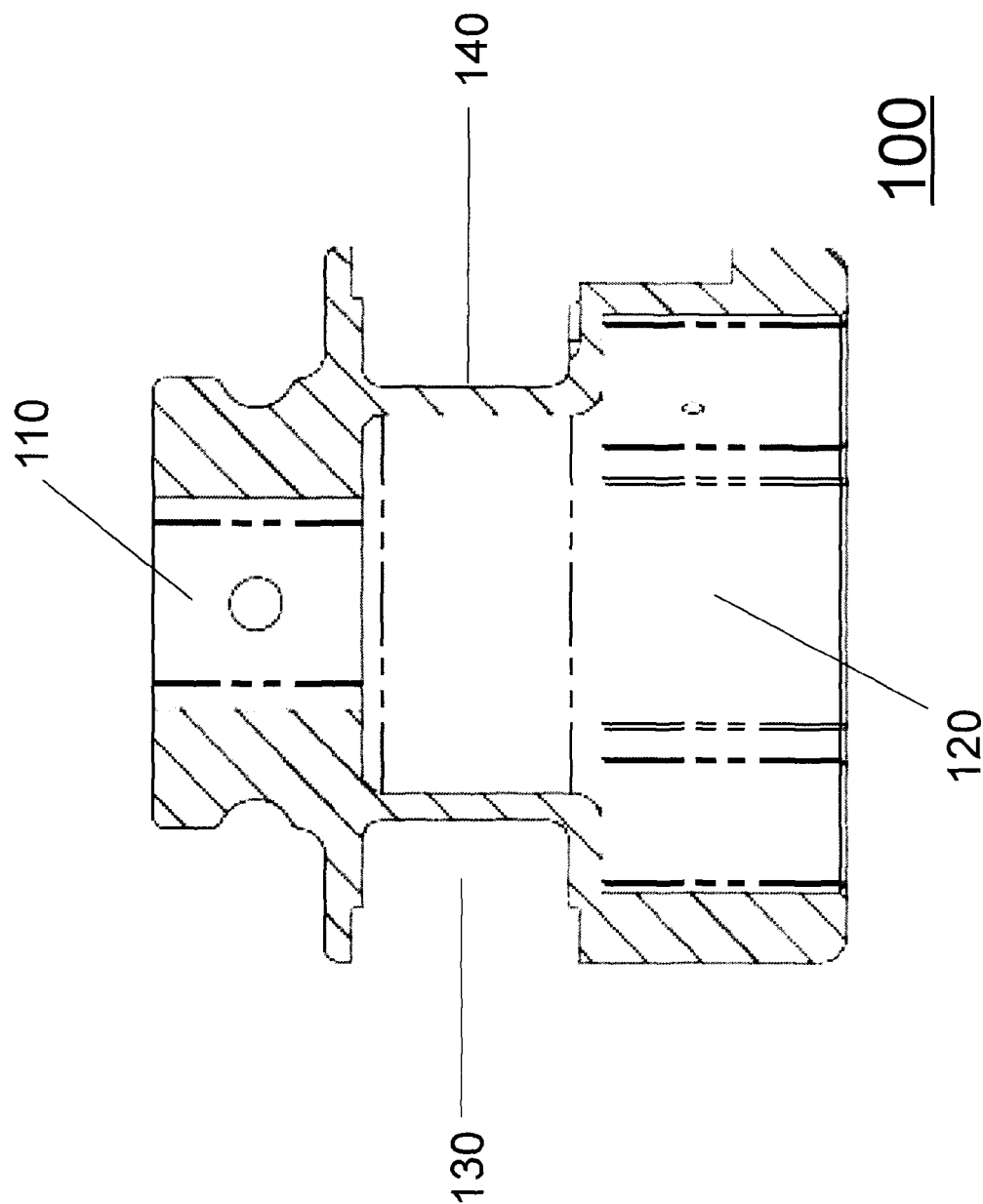
FIG. 2 is a vertical cross-section of the socket subassembly, along its longitudinal axis of symmetry (see also line Y-Y of FIG. 3)
Figure 3:
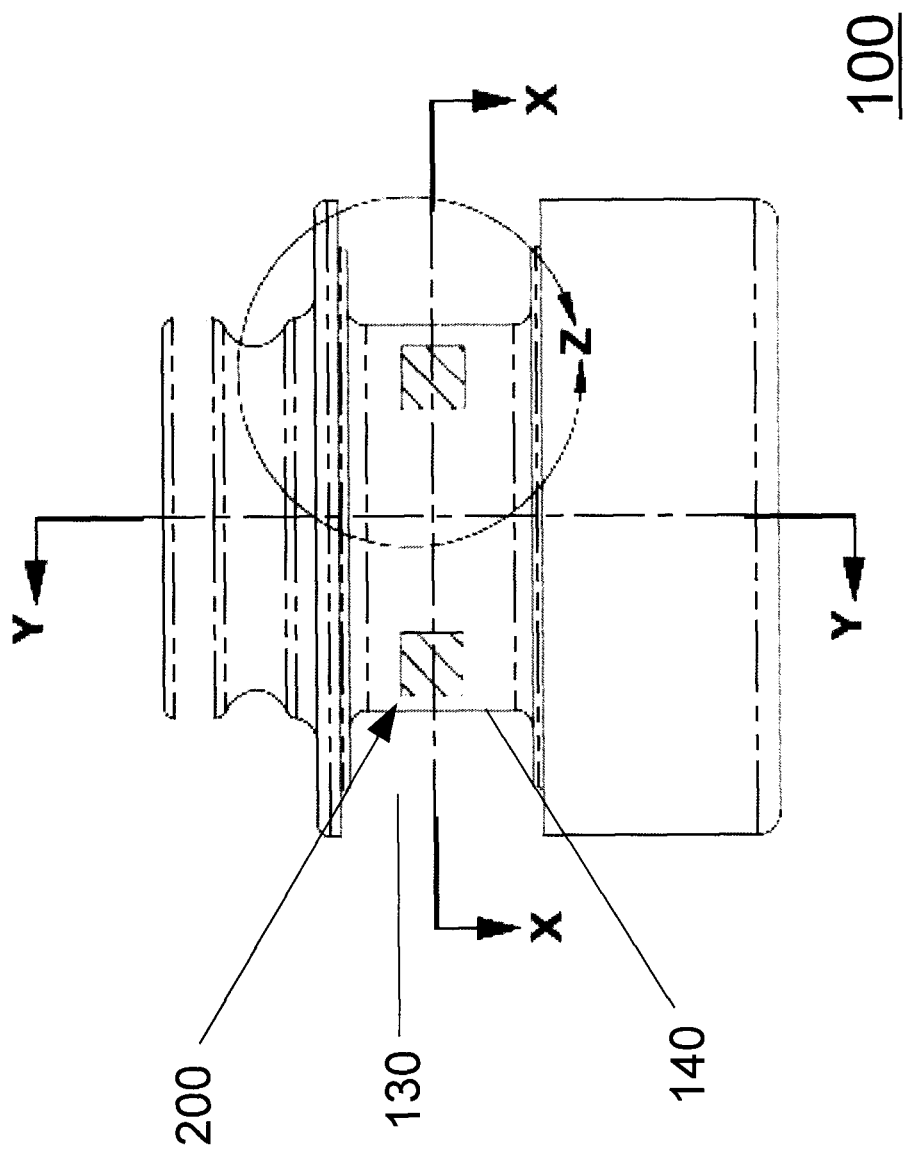
FIG. 3 is a elevation view of the socket subassembly with strain gages of the strain transducer subassembly mounted in externally open, annular channel and indicating vertical cross-section line Y-Y, horizontal cross-section line X-X and a zone Z.
Figure 4:
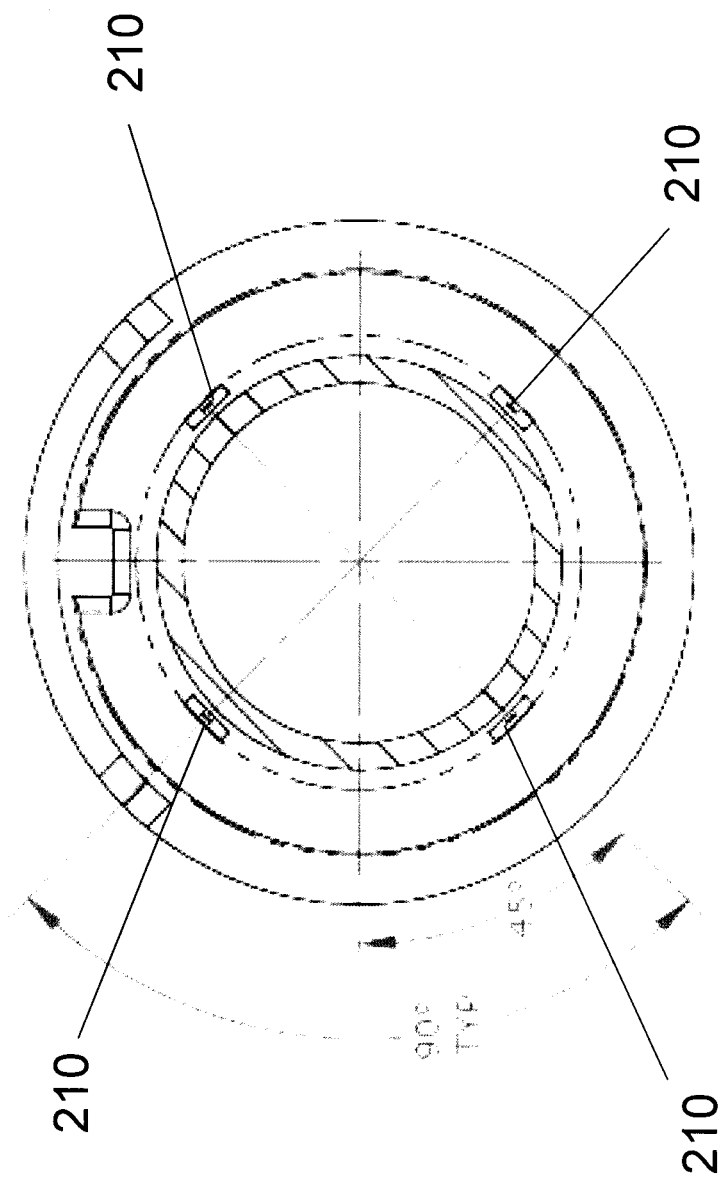
FIG. 4 is a horizontal cross-section along line X-X of FIG. 3 showing the circumferential disposal of four strain gages of the strain transducer subassembly.
Figure 5:
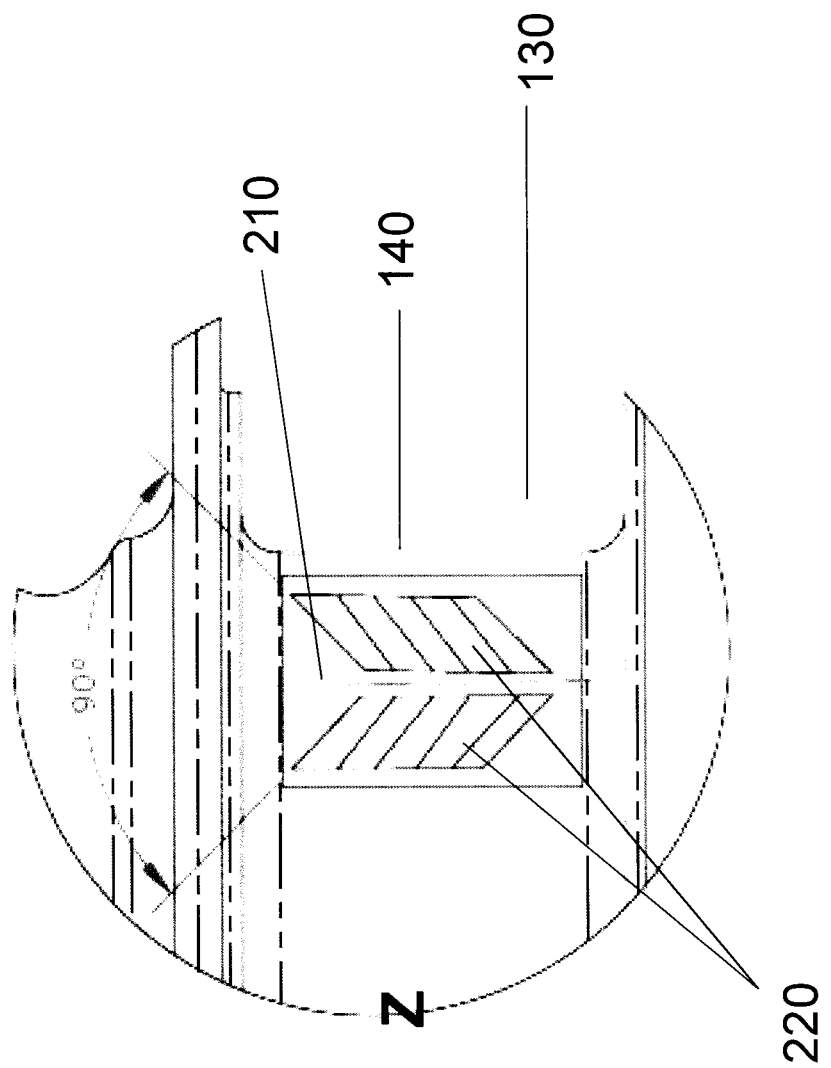
FIG. 5 depicts an enlarged view of zone Z shown in FIG. 3.
Figure 6:
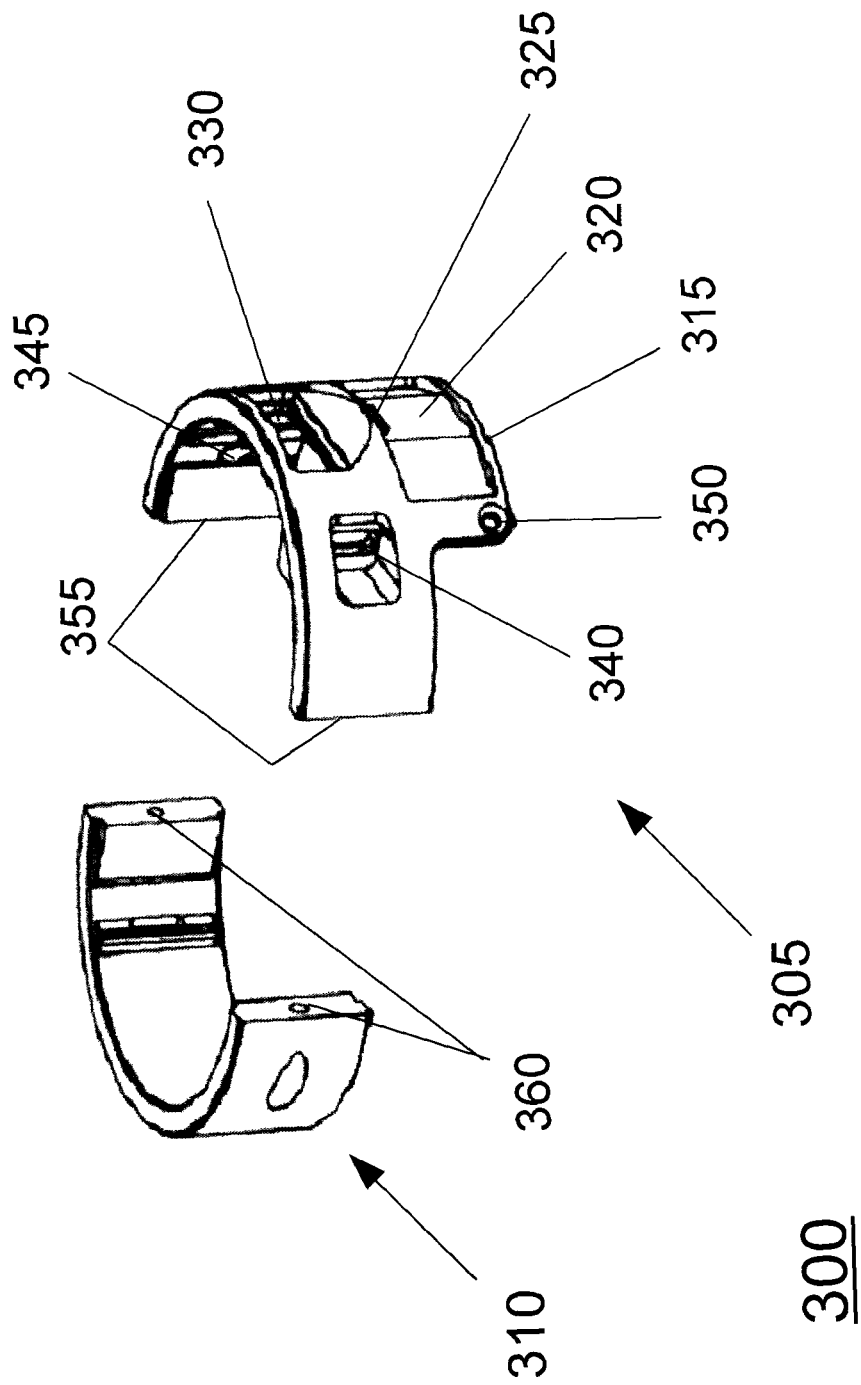
FIG. 6 is a prospective, exploded view of the circular cover subassembly.
Figure 7:
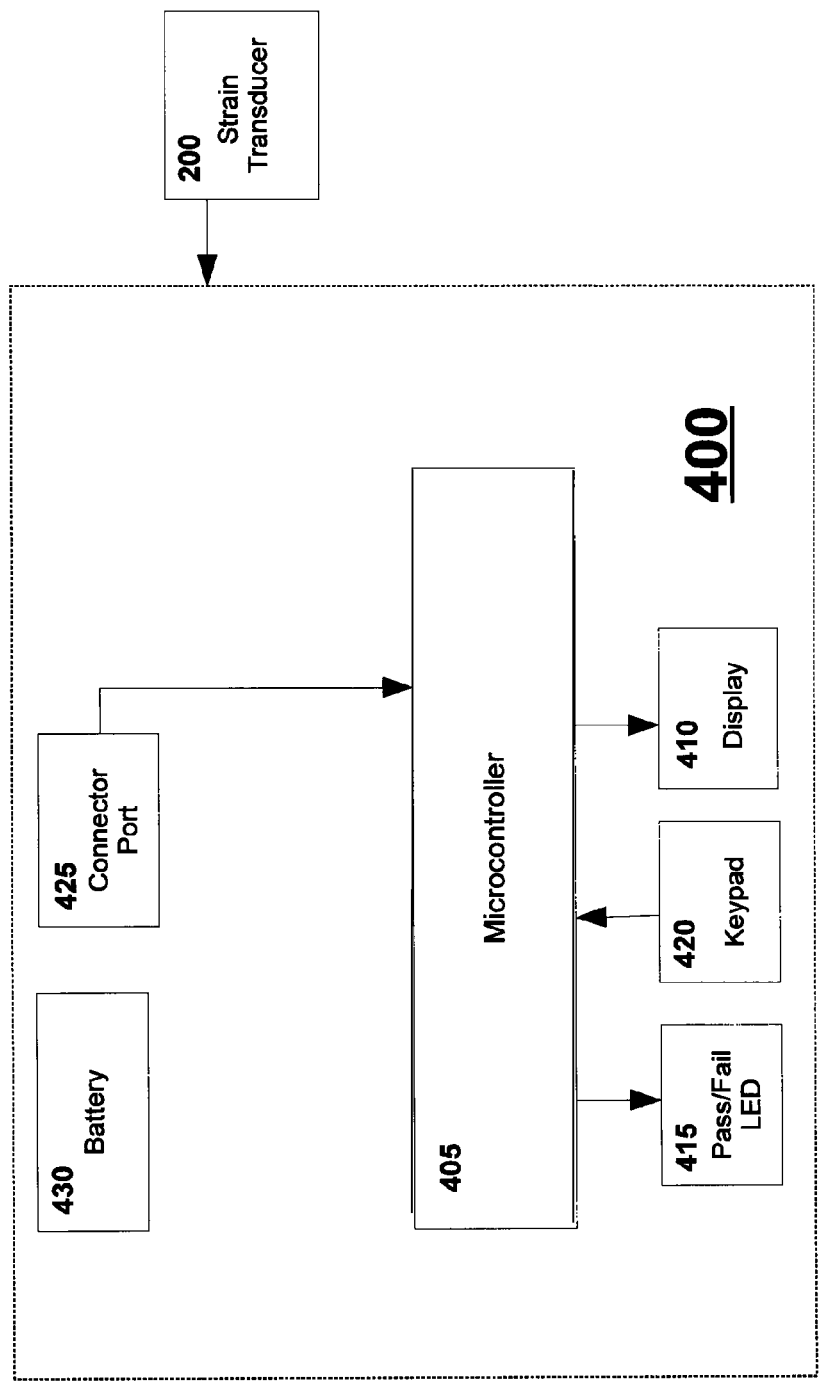
FIG. 7 is a diagrammatic view of the electronic subassembly.

Broadly describing, with reference to FIGS. 1 to 4, an assembly, intercalated between a torque tool and a fastening element, for measuring torques and tightening angles, generally referenced as 10, comprises in combination;

a socket subassembly 100 having an unitary elongated body, including at one extremity a first engaging cavity 110, at an opposite extremity, a second engaging cavity 120; and incorporating an externally open, annular channel 130 provided between the extremities of socket subassembly 100;

a strain transducer subassembly 200, for measuring an torsional strain on the socket subassembly 100, mounted in externally open, annular channel 130;

a circular cover 300 attached to socket subassembly 100 for enclosing externally open, annular channel 130; and a electronics subassembly 400 for converting the torsional strains on the socket subassembly 100 to standard torque values and for determining tightening angular displacement; electronic subassembly 400 is interconnected to strain transducer subassembly 200 and mounted on circular cover 300 to face strain transducer subassembly 200;

Describing now in detail, socket subassembly 100 includes first engaging cavity 110, shaped to conform to and engage with a torque tool exit shaft (not shown), usually of a square drive type; second engaging cavity 120 is shaped to conform to and engage with a fastening element, such as a bolt or nut of a specific size (also not shown); externally open, annular channel 130 is provided with a circular bottom surface 140, precision machined for mounting strain transducer subassembly 200;

strain transducer subassembly 200 comprises four strain gages 210, equally spaced from each other on circular bottom surface 140, intended for measuring torsional strains; each of the four strain gages 210, is of the 45 degree dual grid shear pattern and is made of constantan which is a copper/nickel alloy characterized by constant resistance under variations of temperature, reliability, and extensive service life; each of the four strain gages 210 comprises a pair of parallel strain elements 220, so arranged that a convergence line of parallel strain elements 220 is parallel to the longitudinal axis of symmetry of socket subassembly 100, for measuring torsional strains, only; strain transducer subassembly 200 is wired in a Wheatstone bridge to produce analog voltage signals, proportional to only torsional strains in socket assembly 100, and therefrom in the fastening element;

circular cover subassembly 300 comprises a first and second semicircular segments 305 and 310;

first semi-circular segment 305 incorporates an axial and radial protrusion 315 provided with a indented zone 320 including an opening 325, a window 330 located above axial and radial protrusion 315, a first and a second transversal openings 340, 345, located on either side of window 330; axial and radial protrusion 315 includes a pair of fastening openings 350 for attachment to socket sub-assembly 100; first semi-circular segment 305 includes diametrically opposed threaded openings 355;

second semi-circular segment 310 incorporates a pair of fastening openings 360, corresponding to diametrically opposed threaded openings 355; the former and the latter are used for attachment of first and second semi-circular segments 305 and 310 by fasteners (not shown).

electronic subassembly 400 comprises a processing unit A, a user interface unit B and a power supply unit C;

Processing unit A includes:

a microcontroller 405 for digital and analog signal processing, such as an 8-bit microcomputer of the type made by Silicon Industries, under the name of C8051, mounted on first semi-circular segment 305, and connected to strain transducer subassembly 200, for converting the torsional strain into standard engineering units of torque, for measuring angular displacement by means of a sensor (not shown), for providing date/time function to time stamp tightening cycles and measured parameters, and for parameter and configuration memory storage.

user interface unit B includes;
a display 410, such as EINK display, manufactured by Kent Displays, mounted on first semi-circular segment 305 and viewed through window 330, interconnected to microcontroller 405 providing a feature for displaying the selected imposed parameters (applied torque and/or angular displacement), and for displaying the running and final measured parameters (applied torque and/or angular displacement);

a connection port 420, mounted to first semi-circular segment 305 and accessed through first transversal opening 340, is interconnected to processing unit A for communication to an external device, such as a personal computer or tool's own controller for the purpose of verification of applied torque or angular displacement, or for the purpose of controlling the tool shut-off at the imposed parameter (applied torque and/or angular displacement;

a keypad 415, in the form of multiple discrete push-buttons, of membrane type, as the one made by Padtech Industries, mounted in indented zone 320, is interconnected to processing unit A via opening 325, for selecting the desired parameter for verification (applied torque and/or angular displacement), or for selecting the parameter (applied torque and/or angular displacement) at which to signal the tool's own controller to shut-off at the imposed parameter (applied torque and/or angular displacement;

a pass/fail indicator 418, in the form of a multi color LED, located in second transversal opening 345, and is interconnected to processing unit A for indicating if the measured parameter (applied torque and/or angular displacement), is within the pre-established upper parameter limit and lower parameter limit as defined by the user.

power supply unit C includes;
a power source in the form of a battery 430, such as a compact, rechargeable single cell Lipo, for powering electronic subassembly 400 and;
a battery charging and protection circuit (not shown) for charging battery 430 which is connected to a DC power source (not shown) and protects the battery 430 from over-voltage, under voltage, short circuit and over-temperature.

Operation of the Tool

The user will mount assembly 10, intercalated between a torque tool (not shown) and a fastening element (also not shown), for measuring torques and tightening angles, onto torque tool, such as a powered torque tool (not shown), by inserting the driving tool shaft of the latter into first engaging cavity 110, wherein may be retained by a locking pin. The user will then engage the fastener assembly 19 (not shown) with assembly 10, respectively its second engaging cavity 120.

The user, by using display 410 and keypad 415, can select and modify the ultimate torque and angular displacement values, which are displayed in standard engineering units, by incrementing or decrementing the values via the keypad pushbuttons, or select from a pre-established list of values. By the same means the user may also change the desired standard engineering units for torque, for example NM, ft lbs, etc. Display 410 also indicates the operational readiness of assembly 10.

Under normal operation, microcontroller 405, by means of display 410, will indicate "Ready" when the device has sufficient battery power, and is ready for measurements.

The user will then proceed tightening the fastener by operating the torque tool. On cessation of tool operation, microcontroller 405 will indicate the final measured parameter(s) (applied torque and/or angular displacement) via display 410 and via pass/fail indicator 418, During the tightening process, microcontroller 405 monitors and stores the running measured parameter(s) (applied torque and/or angular displacement) for analysis by the user.

In another operational variant, the user selects an ultimate torque value, and a desired ultimate angular displacement value, therefore providing a means for after the ultimate torque value is achieved microcontroller 405 will zero the position count, and at a pre-established threshold prior to the desired ultimate angular position, the microcontroller 405 sends a signal, or plurality of signals via connection port 420 to the tool's own controller (not shown) to control the approach of and the shutoff of, the tool to achieve the imposed parameter (applied torque and/or angular displacement) within the desired upper and lower parameter limits.

What we claim is:

1. An assembly, intercalated between a torque tool and a fastening element, for measuring torques and angular displacements of a fasteners comprising, in combination:

a socket subassembly having an unitary elongated body, including at one extremity a first engaging cavity, at an opposite extremity, a second engaging cavity; and incorporating an externally open, annular channel provided between said extremities of said socket subassembly;

a strain transducer subassembly, for measuring torsional strains on said socket subassembly, mounted in said externally open, annular channel;

a circular cover attached to said socket subassembly for enclosing said externally open, annular channel; and a electronics subassembly for converting said torsional strains on said socket subassembly to standard torque values and for determining tightening angular displacements; said electronic subassembly being interconnected to said strain transducer subassembly and mounted on said circular cover to face said strain transducer subassembly;

said socket subassembly including said first engaging cavity, shaped to conform to and engage with said torque tool exit shaft, usually of square drive type; said second engaging cavity being shaped to conform to and engage with said fastening element, of a specific size; said externally open, annular channel being provided with a circular bottom surface for mounting said strain transducer subassembly;

said strain transducer subassembly comprises four strain gages, equally spaced from each other on said circular bottom surface, intended for measuring torsional strains; each of said four strain gages being of the 45 degree dual grid shear pattern and being made of constantan comprising a pair of parallel, juxtaposed strain elements, so arranged that a convergence line of said parallel, juxtaposed strain elements is parallel to the longitudinal axis of symmetry of said socket subassembly, for measuring torsional strains, only; said strain transducer subassembly being wired in a Wheatstone bridge to produce analog voltage signals, proportional to only torsional strains in said socket assembly, and therefrom in said fastening element;

said circular cover subassembly comprising a first and second semicircular segments; said first semi-circular segment incorporating an axial and radial protrusion and diametrically opposed threaded openings; said second semi-circular segment incorporates a pair of fastening openings, corresponding to said diametrically opposed threaded openings; said diametrically opposed threaded openings and said pair of fastening openings being used for attachment of said first and second semi-circular segments by fasteners;

said electronic subassembly comprising a processing unit, a user interface unit and a power supply unit;

said processing unit including a microcontroller for digital and analog signal processing, mounted on said first semi-circular segment and connected to said strain transducer subassembly for converting the torsional strain into standard engineering units of torque, for measuring angular displacement by means of a sensor for providing date/time function to time stamp tightening cycles and measured parameters, and for parameter and configuration memory storage;

said user interface unit including a display, mounted on said first semi-circular segment and interconnected to said microcontroller, for showing the selected imposed parameters (applied torque and/or angular displacement), and for showing the running and final measured parameters (applied torque and/or angular displacement);

a connection port, mounted to said first semi-circular segment and interconnected to said processing unit for communication to an external device or for the purpose of controlling said torque tool shut-off at the imposed parameter (applied torque and/or angular displacement);

a keypad, interconnected to said processing unit for selecting the desired parameter for verification (applied torque and/or angular displacement), or for selecting the parameter (applied torque and/or angular displacement) at which to signal said torque tool's own controller to shut-off at the imposed parameter (applied torque and/or angular displacement);

a pass/fail indicator, interconnected to said processing unit, for showing if the measured parameter (applied torque and/or angular displacement), is within the pre-established upper parameter limit and lower parameter limit as defined by the user; and said power supply unit including a power source in the form of a battery and a battery charging and protection circuit.

* * * * *